United States Patent Office 2,962,535
Patented Nov. 29, 1960

2,962,535

SEPARATION OF ORGANIC COMPOUNDS BY COMPLEXING WITH PYROMELLITIC DIANHYDRIDE

Charles D. Heaton and William G. Toland, San Rafael, Calif., assignors to California Research Corporation, San Francisco, Calif., a corporation of Delaware No Drawing. Filed Mar. 9, 1959, Ser. No. 797,847

2 Claims. (Cl. 260—650)

This invention relates to the recovery of chloro-substituted aromatic compounds from mixtures of organic compounds.

In accordance with the present invention, there is provided a method of recovering at least one aromatic compound having at least one nuclear substituted chloro group from a mixture of organic compounds containing said compound, which comprises forming by the addition of pyromellitic dianhydride to said mixture a liquid phase and a solid phase comprising said compound and pyromellitic dianhydride, separating said phases, and recovering said compound as a product from said solid phase.

In the process of the present invention the solid pyromellitic dianhydride complexes with the chloro-substituted compound or compounds in the mixture of organic compounds. The amount of the chloro-substituted compound or compounds that will enter into the complex from a mixture at a given set of temperature and pressure conditions is a function of the concentration of the chloro-substituted compound or compounds in the mixture. The rate of complex formation is increased with an increasing temperature within the operable temperature range; however, it has been found that the complex formed is subject to thermal decomposition as the upper end of the operable temperature range is reached. Therefore, the lower limit of a practical temperature range is dictated by complexing rate, and the upper limit is dictated by the thermal stability of the resulting complex. Accordingly, while the theoretical range for the process is any temperature below 55° F., as a practical matter the process should be operated in a range of about 0° F. to 55° F.

In various actual runs it has been found that chlorobenzene and orthodichlorobenzene readily formed complexes with pyromellitic dianhydride at temperatures within the foregoing temperature ranges. Both compounds formed complexes with pyromellitic dianhydride at 32° F. At temperatures above 55° F., results were unfavorable. The complex with orthodichlorobenzene was stable at 50° F., while at 75° F. no stable complex with chlorobenzene was formed.

The mixture from which the chloro-substituted compound or compounds is to be separated pursuant to the present process may contain other compounds that do not alter or destroy the structure of the complex, and that do not excessively dilute the mixture.

The solid complex formed comprises essentially equimolar amounts of the compounds entering the complex. The chloro-substituted compound or compounds can be recovered in high purity from the solid complex by distillation from the complex under vacuum in a conventional manner.

With the foregoing guide, those skilled in the art readily can determine by routine experimentation the exact amounts of the chloro-substituted compound or compounds in various concentrations in various mixtures thereof with other organic compounds that will complex with pyromellitic dianhydride. In so doing, the temperature limitations given above, of course, must be observed.

What is claimed is:

1. A method of separating at least one aromatic compound having at least one nuclear substituted chloro group from a mixture of organic compounds containing said compound which comprises forming at a temperature below 55° F. by the addition of pyromellitic dianhydride to said mixture a liquid phase and a solid phase comprising a complex of said compound and pyromellitic dianhydride, and separating said phases.

2. A method as in claim 1, wherein said chloro-substituted compound is separated from said solid phase by distillation at a pressure lower than the pressure at which said solid phase was formed.

References Cited in the file of this patent

UNITED STATES PATENTS 2,900,428    Heaton et al. _____ Aug. 18, 1959